Patented Dec. 9, 1924.

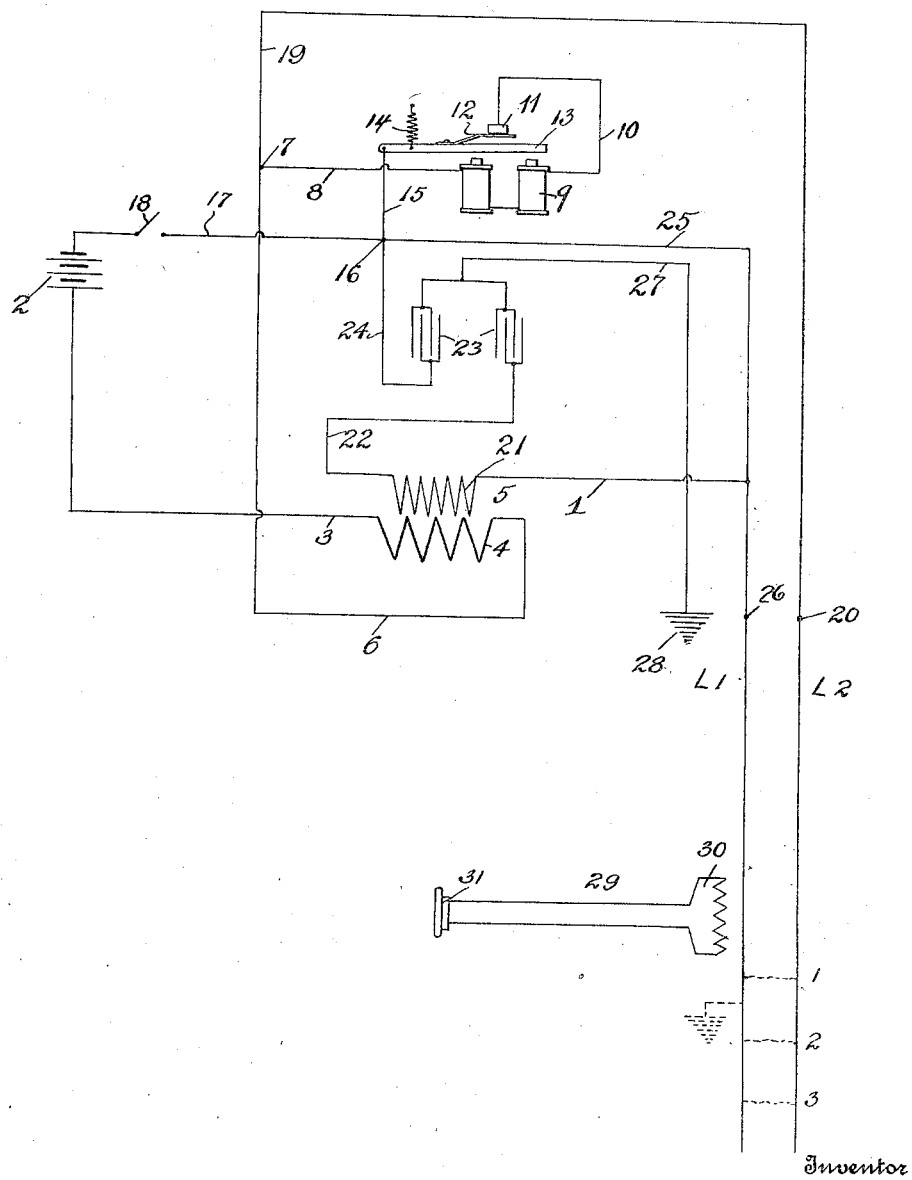

1,518,335

UNITED STATES PATENT OFFICE.

JOHN W. McNICOL, OF URBANA, OHIO.

TELEPHONE-CIRCUIT-TESTING APPARATUS.

Application filed February 14, 1921. Serial No. 444,720.

*To all whom it may concern:*

Be it known that JOHN W. MCNICOL, a citizen of the United States, residing at Urbana, in the county of Champaign and State of Ohio, has invented certain new and useful Improvements in Telephone-Circuit-Testing Apparatus, of which the following is a specification.

This invention relates to improvements in telephony and has particular reference to an improved testing device whereby through the instrumentality of which disorderly conditions, such as grounds, short circuits and the like in and between the wires of telephonic circuits may, with considerable facility, be located by repairmen in a positive, efficient and time saving manner.

In accordance with the invention a testing apparatus is employed which includes in its organization an induction coil, interrupter and condenser situated in primary and secondary circuits which operate when energized to effect current passage through the line wiring, with which the apparatus is connected, up to the point of the first source of trouble in said wiring, whereby an operator may through the use of a supplemental and audible induction testing device determine the exact point or location of the trouble by passing the said device longitudinally of the wiring, the arrangement being such that when the said device has been moved past the trouble the same will be deenergized immediately thus notifying the operator of the exact location of the disorderly condition.

For a further understanding of the invention, reference is to be had to the following description and to the accompanying drawing in which similar characters of reference denote like and corresponding parts thereof.

In said drawing, the figure is a diagrammatic view disclosing the arrangement of the apparatus employed in my improved testing device, and disclosing the use of the latter in connection with a telephonic circuit.

Referring more particularly to the drawing, the numeral 1 designates the apparatus generally employed in the testing device comprising the present invention, the said apparatus being capable of being mounted upon any suitable permanent or portable base and to therefore be capable of being used either for station or outdoor use. The said apparatus consists in the provision of a suitable source of energy 2, which may be in the form of a battery or may be derived from a suitable power station. From the battery a line 3 extends to the primary windings 4 of an induction coil 5, and from the opposite side of the primary windings a wire 6 leads to a fixed terminal 7, which is adapted to be mounted on the base upon which the apparatus is carried. From the terminal 7 a wire 8 leads to a set of electromagnets 9, and after passing through the magnets the said wire is extended as at 10 to a stationary contact 11. Normally disposed in engagement with the contact 11 is a conducting spring 12, which is carried by a pivoted armature 13, and a supplemental spring 14 acts in conjunction with the armature 13 to normally maintain the spring 12 in engagement with the contact 11. From the pivoted end of the armature 13 a return wire 15 is employed which extends to a fixed terminal 16, and a wire 17 leads from the terminal 16 back to the negative side of the source of energy 2, a switch 18 being situated within the wire 17 to control the primary circuit thus described. It will be apparent that by this arrangement of wiring current will pass through the primary windings of the induction coil and thence to the magnets 9 so as to effect the energizing of the latter. Upon energizing the magnets, the primary circuit is broken temporarily by the withdrawal of the spring 12 from engagement with the contact 11, however, the circuit is again restored when the spring 14 acts to again return the armature 13 to its normal position, an interrupter of ordinary construction and operation being therefore provided by this arrangement. From the terminal 7 a wire 19 extends to a fixed terminal post 20, which is adapted to be connected with the wire $L^2$ of a telephone circuit.

Upon the making and breaking of the primary circuit induced currents are set up as usual in the secondary windings 21 of the induction coil, and the secondary circuit includes a wire 22, which leads to a pair of condensers 23, and from the condensers a wire 24 extends to the terminal post 16 and thence by means of a wire 25 to a fixed terminal post 26 to which is connected the other wire $L^1$ of the telephone circuit. It will thus be observed that the primary circuit is connected with one of the wires of the telephone circuit and that the secondary circuit is connected with the other line of the telephone circuit, thus producing a balance, as it were, in the telephone circuit as a whole. A wire 27 is connected with the condensers 23, and leads to the ground terminal 28 of the device, the connection 27 to the ground 28 serving to prevent the current from passing continuously through the ground and passing the initial source of trouble within the line.

By this construction when there exists a ground in either the wires $L^1$ or $L^2$, the wire 27 is connected with ground terminal 28, thus completing a circuit, in which the apparatus 1 forms a part, within the telephone circuit. To determine the point of trouble, the lineman employs an audible induction device 29, which consists of a coil 30 and a receiver 31, with which the wires of the coil 30 are suitably connected. This device is then passed longitudinally of the line, and since the latter is energized by the disordered condition current will be induced in the device 29 so that the diaphragm thereof will be vibrated. As the device nears the point of trouble the vibrations will be increased because it must flow in a cycle and back to the ground 28 so as to notify the operator of the proximity of the trouble. However, in the event that the said device 30 is moved to a position past the trouble, the same will be deenergized by the absence of the current within the line, and the operator is thus immediately notified as to the exact location of the disturbance. The same procedure is followed in the event of a short circuit, with the exception that the wire 27 is disconnected from the ground terminal 28.

What is claimed is:

1. In a telephone circuit testing device, an induction coil including primary and secondary circuits, an interrupter situated within the primary circuit, a pair of condensers located within the secondary circuit, a positive connection between one of the condensers and the interrupter, a ground connection for the condensers, a positive connection between the primary circuit and one of the wires of the telephone circuit, and a positive connection between the secondary circuit and the other line of the telephone circuit.

2. In a telephone circuit testing device, an induction coil including primary and secondary circuits, an interrupting device located within the primary circuit, a positive connection between said primary circuit and one of the lines of the telephone circuit, a condenser located within the secondary circuit, a connection between the secondary circuit and the other line of the telephone circuit, and a ground coupling leading from the condenser construction.

In testimony whereof I affix my signature.

JOHN W. McNICOL.